United States Patent [19]

Brown

[11] 3,772,653

[45] Nov. 13, 1973

[54] BIT RATE CONVERTER

[75] Inventor: Vernon E. Brown, Mabelvale, Ark.

[73] Assignee: Teletype Corporation, Skokie, Ill.

[22] Filed: Apr. 21, 1972

[21] Appl. No.: 246,314

[52] U.S. Cl. .......... 340/172.5
[51] Int. Cl. .......... G06f 5/06
[58] Field of Search .......... 340/172.5

[56] References Cited

UNITED STATES PATENTS

| | | | |
|---|---|---|---|
| 2,905,930 | 9/1959 | Golden | 340/172.5 |
| 3,436,733 | 4/1969 | Pearce et al. | 340/172.5 |
| 3,288,928 | 11/1966 | Bartlett et al. | 340/172.5 |
| 3,121,860 | 2/1964 | Shaw | 340/172.5 |

*Primary Examiner*—Gareth D. Shaw
*Attorney*—J. L. Landis et al.

[57] ABSTRACT

A bit rate converter for converting an incoming data signal having an undertermined bit rate to a preselected bit rate for retransmission includes a plurality of input buffers, each responsive to a data signal having a predetermined bit rate. A selected one of the plurality of input buffers, which is responsive to a predetermined bit rate corresponding to the bit rate of the incoming data signal, is enabled to receive and store the data signal. An associated indicator is then activated to show the bit rate of the data signal. The stored data signal is supplied to an output shift register for retransmission at a preselected bit rate which may be equal to or greater than the bit rate of the incoming data signal.

9 Claims, 2 Drawing Figures

BIT RATE CONVERTER

BACKGROUND OF THE INVENTION

1. FIELD OF THE INVENTION

This invention relates to a bit rate converter circuit and relates particularly to a circuit for recognizing the bit rate of an incoming data signal and converting that data signal to a preselected bit rate for retransmission.

2. DESCIPTION OF THE PRIOR ART

When testing printing telegraph page printers, reperforators and similar message receiving devices, a test signal in the form of a serial binary combination of bits is applied to the device under the test. Should an error occur it is necessary for analysis purposes to know whether the receiving device under test failed or whether there was an unexpected discrepancy in the incoming test signal.

A convenient method of determining the source of the failure is to monitor the incoming test signal to the device under test with another receiving device. Therefore, if a failure occurs and the monitor also shows the failure, it may safely be assumed that the cause of the failure was a discrepancy in the incoming test signal. Receiving devices of this type, however, operate at various speeds, the most common of which are 60, 75 and 100 words per minute or wpm. Since an incoming test signal of one speed cannot be directly connected to a monitor operating at a different speed, each receiving device under test has required a monitor operating at the same speed as the device under test.

To limit the number of monitors necessary for the various receiving devices under test because of the varying speed requirements, it is desirable to employ a one-speed receiving monitor. For example, a monitor which operates at 100 wpm could be employed, and a means provided for converting the incoming signal bit rate, which may be less than or equal to the receiving rate of the monitor, to a bit rate corresponding to 100 wpm.

Conventionally, devices are known for changing the bit rate of data signals. However, these devices require that the bit rate of the incoming signal be known and that a manual adjustment of the device be made to calibrate the device for one particular incoming bit rate. Thus, operation of a device of this type requires that an operator determine the bit rate of an incoming signal and set the device to that rate before it will function. In testing receiving devices which may operate at various speeds, it is more efficient and more economical to monitor the incoming signal with a one-speed receiving monitor and to provide means for recognizing the bit rate of incoming test signal and automatically converting that bit rate to a rate suitable for operating the one-speed monitor.

SUMMARY OF THE INVENTION

It is, therefore, an object of this invention to provide a new and improved circuit for recognizing the bit rate of an incoming data signal and converting that data signal to a preselected bit rate for retransmission.

Another object of this invention is to provide a new and improved bit rate converter for receiving an incoming data signal having an undetermined bit rate and converting that data signal for retransmission at a fixed bit rate.

Still another object of this invention is to provide a new and improved bit rate converter for receiving an incoming data signal at an undetermined bit rate and converting the bit rate to a rate equal to or greater than the maximum rate at which an incoming data signal can be received.

A further object of this invention is to provide a new and improved bit rate converter for recognizing and indicating the bit rate of an incoming data signal having one of a plurality of possible bit rates and for retransmitting the data signal at a preselected bit rate which is equal to or greater than the maximum bitrate of the plurality of possible incoming bit rates.

A bit rate converter illustrating certain principles of this invention may include a plurality of input buffers, each responsive to a data signal having a predetermined bit rate. An incoming data signal having an undetermined bit rate is applied to each of the plurality of input buffers so that a selected one of the plurality of input buffers which is responsive to a predetermined bit rate corresponding to the bit rate of the incoming data signal is enabled to receive the data signal. The data signal is stored in the selected input buffer and then supplied to an output shift register for retransmission at a preselected bit rate which may be equal to or greater than the bit rate of the incoming data signal.

BRIEF DESCRIPTION OF THE DRAWINGS

Other objects and advantages of the present invention will be apparent from the following detailed description when considered in conjunction with the accompanying drawing in which.

DETAILED DESCRIPTION

Figure 1:
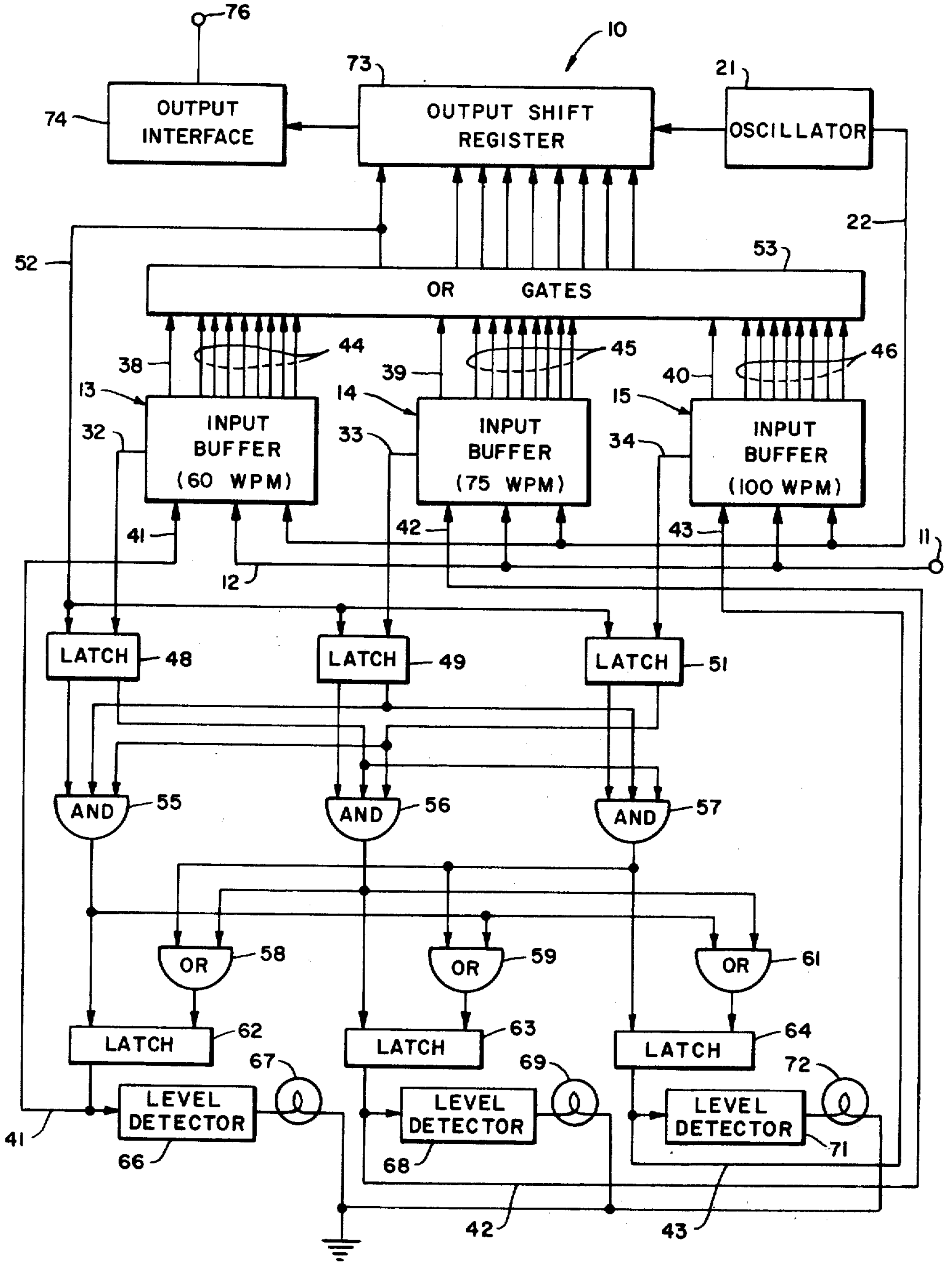
FIG. 1 is a schematic diagram of a bit rate converter in accordance with the principles of the invention.

Referring to FIG. 1, there is illustrated diagrammatically a bit rate converter circuit, designated generally by the numeral 10, embodying the principles of this invention.

An incoming data signal, in the form of a serial combination of binary bits, is applied to an input terminal 11 and is coupled by way of a conductor 12 to input buffers designated generally by the numerals 13, 14 and 15. Each of the input buffers 13, 14 and 15 is designed to receive and store an incoming data signal having a predetermined bit rate. For example, the input buffer 13 may be designed to receive and store a data signal applied to the input terminal 11 at a bit rate corresponding to 60 words per minute, or 60 wpm. The input buffer 14 may be designed to receive and store data signals at the rate of 75 wpm, and the input buffer 15 to receive and store data signals at the rate of 100 wpm.

Thus, if an incoming data signal having an undetermined bit rate corresponding to either 60, 75 or 100 wpm is applied to each of the input buffers 13, 14 and 15 by the input terminal 11 and the conductor 12, one of the input buffers 13, 14 or 15 will be capable of storing the incoming data signal. By way of example, if an incoming data signal having a bit rate corresponding to 75 wpm is applied to the input terminal 11, the input buffer 14 will store the data signal.

It will be apparent that the bit rate converter circuit 10 is not necessarily limited to having three input buffers. As many input buffers may be utilized as are necessary to provide a means for receiving incoming data signals at various other possible bit rates. Additionally, if the incoming data signal occurred only at two different rates, for example 60 wpm and 75 wpm, the bit rate converter circuit 10 would require only two input buffers.

Figure 2:
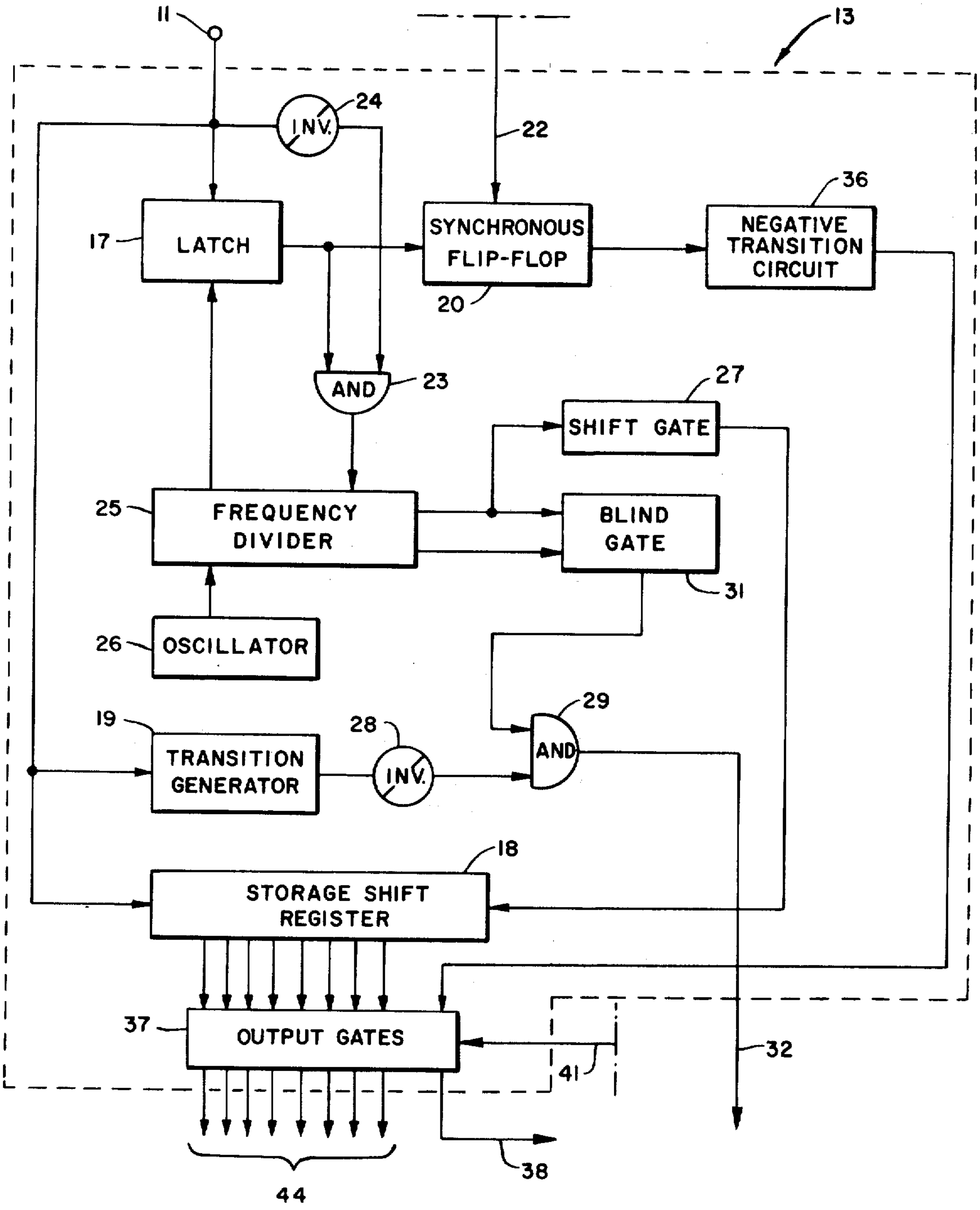
FIG. 2 is a detailed arrangement for an input buffer which may be used in the bit rate converter of FIG. 1.

Referring now to FIG. 2, there is shown a detailed arrangement for an input buffer 13 which is typical of the input buffers 13, 14 and 15 as shown in FIG. 1.

An incoming data signal present on the conductor 12 is applied to a latch 17, a storage shift register 18, and a transition generator 19. The first bit of the data signal is always a start bit which is at a zero voltage level. When the start bit is applied to the latch 17, the latch provides an output signal to a synchronous flip-flop 20 which is normally in the "zero" state. An oscillator 21 (FIG. 1) is connected to the synchronous flip-flop 20 by a conductor 22 to synchronize the operation of the synchronous flip-flop with the operation of the remainder of the bit rate converter circuit 10. The synchronous flip-flop 20 switches from the "zero" state to the "one" state in response to the output signal from the latch 17. The output of the latch 17 is also applied to a first input of an AND gate 23.

The start bit is also passed through an inverter 24 to a second input of the AND gate 23 which then, in response to the outputs of the latch 17 and the inverter 24, applies a positive going pulse to reset a frequency divider 25. An oscillator 26 supplies an input frequency for the frequency divider 25. The frequency of the oscillator 26 is predetermined so that an output will be obtained from the frequency divider 25 at the same rate as the bit rate of the incoming data signal which the input register 13 is designed to store. The output of the frequency divider 25 is applied through a shift gate 27 to the storage shift register 18 so that the incoming data signal is shifted into the shift register 18.

The incoming data signal is applied to the transition generator 19 which generates a negative pulse whenever a transition in the voltage level of the data signal is detected. A transition occurs whenever there is a change in the voltage level of the data signal. The negative pulse from the transition genearator 19 is passed through an inverter 28 and applied as a positive pulse to a first input terminal of a two-input-terminal AND gate 29.

A BLIND gate 31, driven by the frequency divider 25, is connected to the second input terminal of the AND gate 29. If the bit rate of the incoming data signal is at the same frequency as the output of the frequency divider 25, the BLIND gate 31 provides an inhibit signal to the second input of the AND gate 29 whenever a transition should have occurred in the incoming data signal.

If the inhibit signals provided by the BLIND gate 31 do occur at the same frequency as the bit rate of the incoming data signal, the AND gate 29 will be inhibited whenever a positive pulse resulting from a transition in the incoming data signal is applied by the inverter 28 to the first input terminal of the AND gate.

However, if the incoming data signal bit rate is not the same as the output frequency of the frequency divider 25, positive pulses from the inverter 28 will be applied to the first input terminal of the AND gate 29 at times when an inhibit signal from the BLIND gate 31 is not present at the second input terminal of the AND gate. In response to this condition, the AND gate 29 will produce a transition error signal which is coupled to one input of a latch 48 (FIG. 1) by a conductor 32. It will be apparent that the AND gate 29 produces a transition error signal only when the incoming data signal bit rate differs from the bit rate which the input buffer 13 was designed to store.

When the frequency divider 25 has reached a count corresponding to the number of bits in a character of the incoming data signal, a reset pulse is applied to the latch 17 by the frequency divider indicating that an entire character of the incoming data signal has been stored in the storage shift register. In response to the reset pulse, the latch 17 supplies a negative pulse to the synchronous flip-flop 20 which responds by switching from the "one" state to the "zero" state. A negative transition circuit 36 generates a negative transition signal in response to the change of state of the synchronous flip-flop 20 and applies the negative transition signal as a prime signal to a series of output gates 37. The prime signal from the negative transition circuit 36 then passes through the series of output gates 37 and is coupled to a series of OR gates 53 (FIG. 1) by a conductor 38.

The characters stored in the storage shift register 18 are applied to various ones of the inputs of the series of output gates 37. The series of output gates 37 is coupled to a latch 62 (FIG. 1) by a conductor 41 so that a gate control signal may be applied to the series of output gates by the latch. If a gate control signal is applied to the series of output gates 37 by the latch 62 at a time when a prime signal is also applied to the series of output gates by the negative transition circuit 36, the characters stored in the storage shift register 18 will be passed through the series of output gates to the series of OR gates 53 by a plurality of output conductors 44.

Referring again to FIG. 1, the input buffers 14 and 15 are substantially identical to the input buffer 13 described above and shown in FIG. 2, the only difference between the input buffers being the frequency output from the frequency divider 25. The frequency of the oscillator 26 of each of the input buffers 13, 14 and 15 is predetermined so that the frequency output from the frequency divider 25 of each of the input buffers corresponds to the bit rate of the incoming data signal which each input buffer is designed to receive.

Thus, the input buffer 13 may be designed to receive and store incoming data signals having a bit rate corresponding to 60 wpm. Similarly, the input buffer 14 may be designed to receive and store incoming data signals at a rate of 75 wpm. Transition error signals produced by the input buffer 14 are coupled to one input of a latch 49 by a conductor 33. Prime signals from the negative transition circuit 36 (FIG. 2) of the input buffer 14 are coupled to the series of OR gates 53 by a conductor 39 and a plurality of output conductors 45 couples the series of output gates 37 (FIG. 2) to the series of OR gates. Gate control signals are applied to the series of output gates 37 (FIG. 2) of the input buffer 14 by a latch 63 which is coupled to the input buffer by a conductor 42.

The input buffer 15 may be designed to receive and store incoming data signals at a rate of 100 wpm. Transition error signals produced by the input buffer 15 are coupled to one input of a latch 51 by a conductor 34. Prime signals from the input buffer 15 are coupled to the series of OR gates 53 by a conductor 40 and the series of output gates 37 (FIG. 2) are coupled to the series of OR gates by a plurality of output conductors 46.

Gate control signals are applied to the series of output gates 37 (FIG. 2) of the input buffer 15 by a latch 64 which is coupled to the input buffer by a conductor 43.

The second input to each of the latches 48, 49 and 51 is coupled to the series of OR gates 53 by a conductor 52. A signal will be present on the conductor 52 whenever a signal, which may also be referred to as an intermediate signal, appears on any of the conductors 38,39 and 40 in response to a change of the synchronous flip-flop 20 (FIG. 2) from the "one" state to the "zero" state and a generation of a negative transition signal by the negative transition element 36.

A transition error signal, which may also be referred to as an intermediate signal, will appear on two of the conductors 32, 33 or 34 when an incoming data signal having a particular bit rate is applied to the input buffers 13, 14 and 15. One of the input buffers 13, 14 or 15 will be enabled to store the data signal and hence will detect no transition error. For example, if a data signal is applied to the input terminal 11 at a rate of 75 wpm, the input buffer 14 will receive and store the data signal while the input buffers 13 and 15, having been designed to receive 60 and 100 wpm, will both detect transition errors.

The outputs from the latches 48, 49 and 51 are connected in permutation form to the inputs of AND gates 55, 56 and 57 so that whenever two of the latches 48, 49 and 51 have been energized as a result of a transition error signal being present at their respective inputs, an output will be obtained from one of the AND gates 55, 56, or 57. In the case of an incoming data signal at 75 wpm, an output will be obtained from the AND gate 56 indicating that no transition error was detected by the input buffer 14 and that transition errors were detected by the input buffers 13 and 15.

The output of the AND gate 55 is connected to OR gates 59 and 61. The output of the AND gate 56 is connected to an OR gate 58 and to the OR gate 61. Similarly, the output of the AND gate 57 is connected to the OR gates 58 and 59. The outputs of the AND gates 55, 56 and 57 are also connected respectively to the first input terminals of latches 62, 63 and 64, each having two input terminals. The outputs of the OR gates 58, 59 and 61 are connected respectively to the second input terminals of the latches 62, 63 and 64 so that the latch associated with the input buffer 13, 14 or 15 which receives the incoming data signal will be energized. The conductors 41, 42 and 43 associated respectively with the input buffers 13, 14 and 15 are connected respectively to the output terminals of the latches 62, 63 and 64.

Also connected to the output terminal of the latch 62 associated with the input buffer 13 is a level detector 66 and an indicator 67. Whenever the latch 62 is energized in response to a data signal being received and stored by the input buffer 13, the level detector 66 will detect the output signal of the latch 62 present on the conductor 41 and activate the indicator 67. This will indicate that an incoming data signal has been stored which has a rate corresponding to the rate of the input buffer 13. The indicator 67 may be, for example, a light as shown in FIG. 1 to visually indicate the bit rate of the incoming data signal. Similarly, a level detector 68 and an indicator 69 are connected to the output terminal of the latch 63 to indicate that the input buffer 14 has received a data signal and a level detector 71 and an indicator 72 are connected to the output terminal of the latch 64 to indicate that the input buffer 15 has received a data signal.

If, for example, a 75 wpm data signal is applied to the input terminal 11, the input buffer 14 will not detect a transition error and will store the data signal. The latch 63 will be energized providing a gate control signal to the output gates 37 (FIG. 2) of the input buffer 14, and activating the indicator 69 through the level detector 68. The latches 62 and 64, however, will remain deenergized thereby providing inhibit signals to the respective output gates 37 of the input buffers 13 and 15.

Thus, the outputs obtained from the latches 62, 63 and 64 provide gate control signals for the output gates 37 (FIG. 2) of the input buffers 13, 14 and 15. When any selected one of the input buffers 13, 14 or 15 receives a gate control signal, the output gates 37 (FIG. 2) will apply the data signal, which has been stored in the storage shift register 18 (FIG. 2), to the series of OR gates 53 by way of one of the plurality of output conductors 44, 45 or 46. The data signal will pass through the series of OR gates 53 to the inputs of an output shift register 73.

The output or intermediate signal from the negative transition circuit 36(FIG. 2) of the input buffers 13, 14 and 15, which is applied to the series of OR gates 53 by the conductors 38, 39 and 40, respectively, passes through the series of OR gates and is applied to the output shift register 73 by the conductor 52. The presence of a signal on the conductor 52 provides a shift-in signal to the output shift register 73 so that the data signal presented to the inputs of the output shift register will be stored therein.

The oscillator 21, which may operate at a frequency of 110 Hertz, provides a clock or synchronizing source for transmitting the data signal stored in the output shift register 73 through an output interface 74 to an output terminal 76 at a preselected rate of 100 wpm.

A receiving device, such as a monitor (not shown) operating at 100 wpm, may then be connected to the output terminal 76 to receive data signals which may appear at the input terminal 11 of the circuit 10 at a rate of 60, 75 or 100 wpm but which will be retransmitted to the monitor at 100 wpm. It will be apparent that the bit rate converter circuit 10 is not limited to retransmission of an incoming data signal at a rate of 100 wpm. By varying the frequency of the oscillator 21, the incoming data signal may be retransmitted at any desired rate that is equal to, or greater than the maximum rate at which an incoming data signal will be received by the input buffers 13, 14 and 15.

In operation, an incoming data signal at an undetermined rate is applied to the input terminal 11 and then to each of the input buffers 13, 14 and 15. Assuming for the purpose of illustration that the data signal has a rate of 75 wpm, the input buffers 13 and 15, which are designed to receive 60 and 100 wpm, respectively, will detect transition errors. Since the input buffer 14 is designed to receive 75 wpm, the input buffer will not detect a transition error, but will store the data signal in the storage shift register 18 (FIG. 2).

The latches 48 and 51 will both be energized by the transition error signals developed by the input buffers 13 and 15. The latch 49 will not be energized since there is no transition error signal produced by the input buffer 14.

These outputs from the latches 48, 49 and 51 are applied to the AND gates 55, 56 and 57 so that an output is obtained only from the AND gate 56, indicating that a transition error was not detected by the input buffer 14.

The outputs of the AND gates 55, 56 and 57 are applied to the OR gates 58, 59 and 61 and to the latches 62, 63 and 64 so that, in this example, the latch 63 associated with the input buffer 14 will be energized. The latch 63 thereby develops a prime signal and the latches 62 and 64 develop inhibit signals.

The level detector 68 responds to the prime signal developed by the latch 63 and activates the indicator 69, thereby positively indicating that the rate of the data signal applied to the input terminal 11 corresponds to the rate at which the input buffer 14 will receive data signals, or in this example 75 wpm.

The prime signal developed by the latch 63 is applied as a gate control signal to the output gates 37 (FIG. 2) of the input buffer 14 allowing the data signal stored in the storage shift register 18 to be applied to the series of OR gates 53 by the plurality of output conductors 45. A prime signal from the negative transition circuit 36 of the input buffer 14, which has passed through the output gates 37, is applied through the series of OR gates 53 to the output shift register 73 as a shift-in signal, so that the data signal is stored in the output shift register. The output shift register 73 is driven by the oscillator 21 so that the data signal stored in the output shift register is then applied to the output terminal 76 through the output interface 74 at a rate of 100 wpm for transmission at that rate.

It is to be understood that the above-described embodiment is simply illustrative of the invention, and that other embodiments may be devised by those skilled in the art which will embody the principles of the invention and fall within the spirit and scope thereof.

What is claimed is:

1. A bit rate converter for receiving an incoming data signal having an undetermined one of a plurality of possible bit rates and converting the data signal for transmission at a preselected bit rate which comprises:

a plurality of input buffers, each having a plurality of output conductors and each responsive to a data signal having a different predetermined bit rate, so that a selected one of said plurality of input buffers will store an incoming data signal having an undetermined one of a plurality of possible bit rates, said plurality of input buffers generating a plurality of intermediate signals in response to the incoming data signal;

means, coupled to said plurality of input buffers and responsive to said plurality of intermediate signals, for producing a control signal which is representative of the bit rate of the incoming data signal, said plurality of input buffers being responsive to said control signal to apply the data signal to said plurality of output conductors;

means, coupled to said plurality of output conductors, for receiving and holding the data signal applied to said plurality of output conductors; and means, coupled to said receiving and holding means, for transmitting said data signal from said receiving and holding means at a preselected bit rate equal to or greater than the bit rate of the incoming data signal.

2. A bit rate converter as defined in claim 1 which further comprises means coupled to said producing means and responsive to said control signal for indicating the bit rate of the incoming data signal.

3. A bit rate converter as defined in claim 1 wherein said receiving and holding means further comprises;

a series of gates connected to said plurality of output conductors for receiving said data signal from said storing and generating means; and a register connected to said series of gates for storing said data signal to be transmitted at said preselected bit rate.

4. A bit rate converter for receiving an incoming data signal having an undetermined bit rate and converting the signal for transmission at a preselected bit rate which comprises;

a plurality of input buffers, each having a plurality of output conductors and each responsive to a data signal having a predetermined bit rate distinct from the predetermined bit rates to which the remaining input buffers respond, so that a selected input buffer of said plurality of input buffers will store an incoming data signal having an undetermined bit rate which corresponds to the predetermined bit rate of said selected input buffer, said plurality of input buffers generating a plurality of intermediate signal in response to the incoming data signal;

means, responsive to said plurality of intermediate signals from said plurality of input buffers, for producing a control signal and for applying said control signal to said selected input buffer so that the data signal stored in said selected input buffer is supplied to said plurality of output conductors of said selected input buffer;

a series of gates coupled to said plurality of output conductors of each of said plurality of input buffers for receiving the data signal from said plurality of output conductors of said selected input buffer;

a register for receiving and storing the data signal from said series of gates; and means for transmitting the data signal stored in said register at a preselected bit rate equal to or greater than the bit rate of the incoming data signal.

5. A bit rate converter as defined in claim 4 which further comprises means coupled to said producing means and responsive to said control signal for indicating said predetermined bit rate of said selected input buffer and thereby the corresponding bit rate of the incoming data signal.

6. A bit rate converter as defined in claim 4 wherein each of said plurality of input buffers further comprises;

a frequency divider for establishing said predetermined bit rate of each of said plurality of input gates;

means coupled to said frequency divider for storing the incoming data signal if the bit rate of an incoming signal applied to said plurality of input buffers is the same as said predetermined bit rate established by said frequency source;

means coupled to said frequency divider for generating said intermediate signal if the bit rate of the incoming signal differs from said predetermined bit rate established by said frequency divider; and means coupled to said storing means for applying the data signal from said storing means to said plurality of output conductors in response to said control signal.

7. A bit rate converter as defined in claim 4 wherein said transmitting means further comprises:
an oscillator coupled to said register for generating said preselected bit rate and for synchronizing the transmission of the data signal stored in said register with said preselected bit rate; and
an output interface, having an output terminal and coupled to said register, for coupling the data signal transmitted from said register to said output terminal.

8. A bit rate converter for receiving an incoming data signal having an undetermined bit rate and converting the data signal to a preselected bit rate for retransmission which comprises:
a plurality of input buffers, each responsive to a data signal having a predetermined bit rate distinct from the predetermined bit rates to which the remaining input buffers respond, so that an incoming data signal having an undetermined bit rate will be received and stored by a selected one of said plurality of input buffers which is responsive to data signals having a predetermined bit rate corresponding to the undetermined bit rate of the incoming data signal, said plurality of input buffers generating a plurality of intermediate signals in response to the incoming data signal;
means responsive to said plurality of intermediate signals for producing a control signal representative of the bit rate of the incoming data signal and for coupling said control signal to said selected one of said plurality of input buffers so that the data signal is removed from storage therein;
a register for receiving and storing the data signal for retransmission;
a series of gates, coupling said plurality of input buffers and said register, for shifting the data signal from said selected one of said plurality of input buffers into said register when the data signal is removed from storage in said selected one of said plurality of input buffers; and
means coupled to said register for retransmitting the data signal stored in said register at a preselected bit rate equal to or greater than the bit rate of the incoming data signal.

9. A bit rate converter as defined in claim 8 which further comprises means coupled to said producing means and responsive to said control signal for indicating said predetermined bit rate of said selected one of said plurality of input buffers and thereby the bit rate of the incoming data signal.

* * * * *